Oct. 15, 1940.     M. KATCHER     2,217,801
BEARING
Filed April 15, 1940
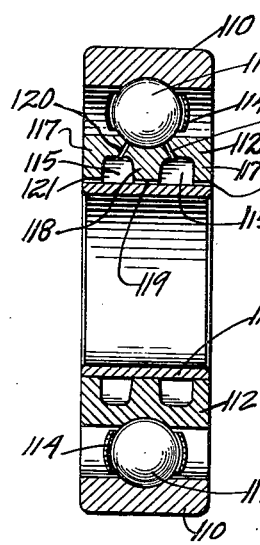
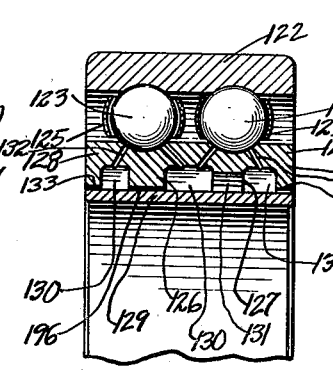
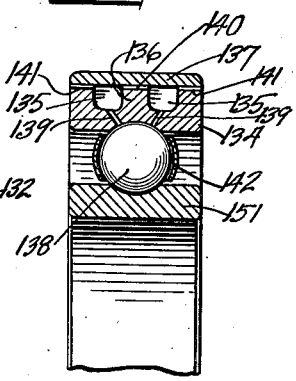
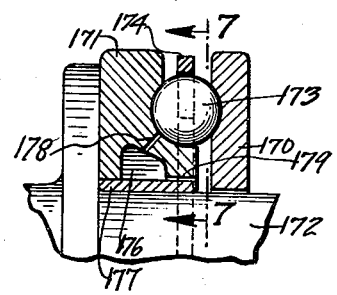
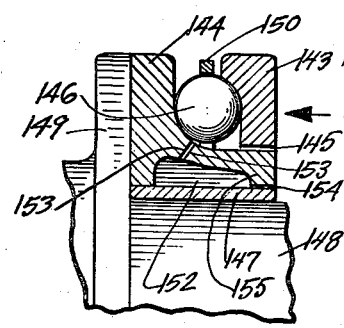
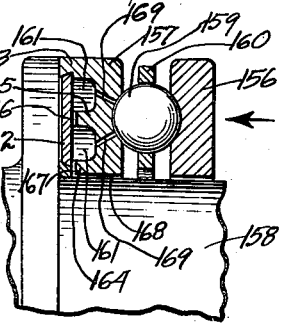
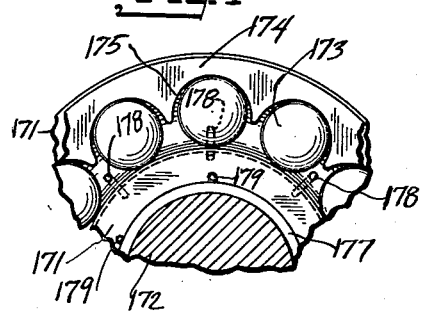
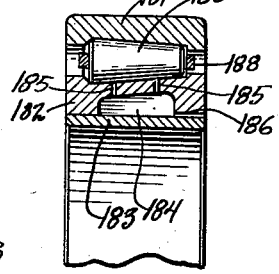
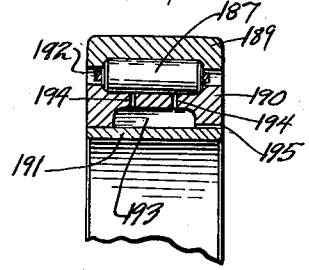
INVENTOR
*Morris Katcher*
BY
*Emanuel Scheyer*
ATTORNEY Patented Oct. 15, 1940

2,217,801

UNITED STATES PATENT OFFICE 2,217,801

BEARING

Morris Katcher, New York, N. Y.

Application April 15, 1940, Serial No. 329,772

10 Claims. (Cl. 308—187)

This invention relates to bearings both ball and roller including annular and thrust bearings. It has as an object the provision of a reservoir, the lubricant within which is substantially protected from the atmosphere to prevent its deterioration, only enough lubricant at any time being discharged into the space between the race rings for efficient lubrication, the discharge being through passages of small cross section. Capillary passages may be used. The reservoir is situated in one of the race rings, or is at least closed on some of its sides by one of the race rings, the other side or sides being closed by a sheet metal shell. It can be said in other words that the reservoir is formed in one race ring or that a part of one race ring is cut away or omitted to provide space for the reservoir. Feed passages lead from the reservoir through said race ring and discharge lubricant preferably into one of the ball grooves. The feed passages enter the ball grooves over to one side of the latter to avoid pressure of the balls on the ends of the passages. In addition to the feed passages, the reservoirs are connected to atmosphere by small vent passages which permit the entrance of air into the reservoirs as the grease leaves it. As the bearing heats with use lubricant is forced through the feed passages to the balls or rollers as the case may be. In certain modifications shown, centrifugal force helps to force out lubricant from the feed passages.

In some forms of my bearing the reservoir is in one of the race rings with the lubricant sealed substantially out of contact with the atmosphere while the space between the race rings may be exposed to the air. In prior art bearings where the reservoir is in reality an extension of the space between the race rings, in order to seal off the lubricant in the reservoir, it is necessary at the same time to have a special housing to seal off the space between the race rings from the atmosphere.

This application is a continuation in part of my application Serial No. 300,913, which latter shows a modification of the bearing.

Other objects and advantages will become apparent upon further study of the description and drawing, in which:

Fig. 1 is a section through one type of an annular ball bearing.

Fig. 2 is a partial section through a second type of annular ball bearing.

Fig. 3 is a partial section through a third type of annular ball bearing.

Fig. 4 is a partial section through a thrust bearing.

Fig. 5 is a partial section through another type of thrust bearing.

Fig. 6 is a partial section through still another type of thrust bearing.

Fig. 7 is a partial section taken along the line 7—7 of Fig. 6.

Fig. 8 is a partial section through a tapered roller bearing, and

Fig. 9 is a partial section through a cylindrical roller bearing.

The balls 111, in the bearing of Fig. 1 are mounted between outer race ring 110 and inner race ring 112 each ring being provided with the usual ball groove. Retainer ring 114 maintains balls 111, as is well known in the art, in spaced relation around the bearing between race rings 110 and 112. Inner race ring 112 is provided with space 115, serving as a reservoir which is filled with lubricant preferably having a certain amount of stiffness at ordinary temperatures, such as heavy grease. The inner wall of reservoir 115 is provided by sheet metal shell 116 which is held in inner race ring 112 with a forced fit. As is well known to the art, shell 115 could also be retained in inner race ring 112 by being peened over at its edges. When a wheel is mounted on outer race ring 110, and inner race ring 112 is mounted on a shaft or other support, a radial pressure inward on the wheel or a radial pressure outward on the shaft will cause balls 111 to bear against inner race ring 112 between its outer ribs 117. This would subject the portion of inner race ring 112 between said ribs to bending and shear stresses were it not for strut rib 118 which transmits a large part of the pressure directly between balls 111 and shell 116. A connecting passage 119 is provided across rib 118 to connect the parts of reservoir 115 separated by rib 118. Also small passages or vents 121 are provided through outer ribs 117 connecting reservoir 115 with atmosphere. Feed passages 120 connect reservoir 115 with the ball groove in inner race ring 112. Although passages 119, 120 and 121 are only shown in the plane of the section, it is to be understood that other similar passages, as in Fig. 7 are to be used in spaced relation circumferentially around race ring 112.

It is believed the action is as follows:

As race rings 110 and 112 rotate with respect to each other and balls 111, the grease or other stiff lubricant in reservoir 115 becomes heated, expanding and entering the ball groove in inner race ring 112. Preferably a less number of passages or vents 121 are provided around race ring 112 than feed passages 120, and the latter are preferably of larger bore so that the grease enters the ball groove through passages 120 more readily than out vents 121. In the case where outer race ring 110 is fixed and inner race ring 112 rotates, centrifugal force helps to send the grease out from reservoir 115 through passages 120. Upon cooling, the grease contracts and air is sucked in from the outside through vents 121. The next time the bearing goes into action and its temperature is raised, the air bubbles previously sucked in expand and force a certain amount of grease into the race, assisted by centrifugal force as noted above if race ring 112 does the rotating. This action continues with the alternate heating and cooling of the bearing as it goes into and out of action. Provision could be made for a grease fitting to replenish the lubricant if necessary. With the proper proportioning, however of reservoir 115 and its passages, the lubricant should last during the life of the bearing.

The bearing of Fig. 2 is similar to that of Fig. 1 except that the former has a double row of balls. The outer race ring 122 has two ball grooves for receiving the double row of balls 123. Inner race ring 124 likewise has two ball grooves. Retainer rings 125 maintain the balls in spaced relation. Because of the double row of balls, there are two strut ribs, rib 126 and rib 127 across reservoir 130, one rib radially inward from each row of balls to reinforce the portion of inner race ring 111 between its outer ribs 128. The inner wall of reservoir 130 is provided by sheet metal shell 129 which is in a tight fit with the inside of race ring 124. Rib 126 is provided with a connecting passage 196 joining the portions of reservoir 130 on either side of it. A similar passage could be provided across rib 127, but instead an arched opening 131 is shown as an alternative construction. While only the arch opening at the section is shown, it is understood that there are a succession of such arches around rib 127. The arch opening 131 permits the lubricant to pass between the portions of reservoir 130 on either side of it and rib 127 strengthens the portions of ring 124 between rib 126 and rib 128. Vent passages 133 are provided through outer ribs 128. Feed passages 132 lead from reservoir portions 130 to the ball grooves of race ring 124. It is to be understood that other similar passages to those shown are to be used in spaced relation around race ring 124. As is the case in Fig. 1, preferably a less number of vents or passages 133 are provided around race ring 124 than the other passages and the latter are preferably of larger bore.

The action of the bearing of Fig. 2 is similar to that described for Fig. 1, the lubricant entering the ball grooves in race ring 124 through feed passages 132.

The bearing of Fig. 3 differs from those just described in that the reservoir is carried in the outer portion of the outer race ring 134. Outer race ring 134 is grooved to provide reservoir portions 135 and strut rib 136. The outer wall of reservoir 135 is provided by annular shell 137 which has a tight fit with outer race ring 134. The radially inward face of race ring 134 is provided with a ball groove for receiving balls 138. Retainer ring 142 holds the balls in spaced relation. Feed passages 139 lead from reservoir portions 135 to the ball groove in race ring 134 for supplying lubricant to said groove. A passage 140 leads across strut rib 136. Vent passages 141 connect reservoir portions 135 with the atmosphere. All the passages are provided in spaced relation to each other around race ring 134 and bear the general relationship to each other as described for the passages of Fig. 1. The action of the bearing of Fig. 3 is in general similar to that of Fig. 1, except that the former is more suitable where the outer race ring 134 is stationary and inner race ring 151 does the rotating, otherwise centrifugal action will tend to force the grease out vent passages 141.

The bearing of Fig. 4 differs from those already described in that it is designed to take axial thrust while those already described take only radial thrust. A race ring 143 rotates about one end of race ring 144, there being clearance 145, provided between said rings. Between said rings is a row of balls 146, each ring being provided with a curved surface which is the equivalent in function to a groove to receive the balls, a line joining the centers of the curved surfaces making substantially an angle of 45 degrees with the longitudinal axis of the bearing. Retaining ring 150 maintains balls 146 in spaced relation. Race ring 144 has a tight fit on inner shell 147. In bearings of this type, the inner shell, such as shell 147, is fixed to a shaft 148, while race ring 143 is free. The arrow indicates the direction of the thrust, either active or passive, balls 146 being compressed between race ring 143 and race ring 144, the latter being backed up by shoulder 149 on shaft 148. No thrust rib is used here because the thrust from balls 146 passes directly through the radially extending portion of race ring 144. The latter race ring is hollowed out to provide a reservoir 152, the inner wall of which is provided by shell 147. From reservoir 152, feed passages, one of which is shown at 153, lead to the curved portion of race ring 144 which serves as a ball groove. Vent passages, one of which is shown at 154 lead from reservoir 152 through outer rib 155 of race ring 144.

The bearing of Fig. 5 is also a thrust bearing. In this type free race ring 156 is entirely to one side of race ring 157 which is fixed to shaft 158. Race rings 156 and 157 are provided with oppositely disposed ball grooves in which balls 159 ride. Retainer ring 160 keeps balls 159 in spaced relation. Race ring 157 is provided with space 161 which serves as a lubricant reservoir. Space or reservoir 161 is closed by washer 162 which is held in position on race ring 157 by the peening over of the ends of outer rib 163 and inner rib 164. An inner strut rib 165 acts as a strut for the thrust just as strut rib 118 of Fig. 1. Strut rib 165 divides reservoir 161 in two passages, one of which is shown at 166, connecting the two parts of the reservoir. Vent passages connect reservoir 161 with the atmosphere at shaft 158, one such passage being shown composed of a radial branch 167 and an axial branch 168. Feed passages 169 connect reservoir 161 with the ball groove in race ring 157.

The bearing of Fig. 6 is also a thrust bearing. As in Fig. 5, free race ring 170 is entirely to one side of race ring 171 which is fixed to shaft 172. Race rings 170 and 171 are provided with oppositely disposed ball grooves in which balls 173 ride. Retainer ring 174 keeps balls 173 in spaced relation. Retainer ring 174, which is shown in partial elevation in Fig. 7, has notches 175 formed in its inner edge in which balls 173 are retained in spaced relation. The elevation of the retainer ring 150 of Fig. 4, is similar to that shown for retainer ring 174 in Fig. 7. Race ring 171 is provided with space 176 which serves as a lubricant reservoir. Space or reservoir 176 is closed by shell 177 which fits tightly in race ring 171. Feed passages, one of which is shown at 178, connect reservoir 176 with the ball groove in race ring 171. Vent passages, one of which is shown at 179, connect reservoir 176 with the atmosphere.

The bearing of Fig. 8 is a tapered roller bearing, one of the rollers being shown at 180. Outer race ring 181 and inner race ring 182 are provided with oppositely disposed grooves for rollers 180 to roll in. Retainer ring 188 holds rollers 180 in spaced relation. Inner race ring 182 has shell 183 fixed in it. A lubricant reservoir 184 is provided in ring 182, the inner wall of the reservoir being shell 183. Feed passages 185 lead from reservoir 184 to the groove under rollers 180 in ring 182. Vent passages, one of which is shown at 186 connect reservoir 176 with the atmosphere.

The bearing of Fig. 9 is also a roller bearing, the rollers, one of which is shown at 187, being cylindrical. Outer race rings 189 and inner race ring 190 are provided with oppositely disposed grooves for rollers 187 to roll in. Retainer ring 192 holds rollers 187 in spaced relation. Inner race ring 190 has shell 191 fixed in it. A lubricant reservoir 193 is provided in ring 190, the inner wall of the reservoir being shell 191. Feed passages 194 lead from reservoir 193 to the groove under rollers 187 in ring 190. Vent passages, one of which is shown at 195, connect reservoir 193 with the atmosphere.

The feed passages and vent passages of Figs. 1-9 occur in spaced relation circumferentially around that race ring in each figure which is provided with the reservoir. Said passages bear the relation to each other in number and size as described for Fig. 1. The feeding of the lubricant in said figures from the reservoir to the ball or roller groove is also similar to that explained for Fig. 1.

In its broadest sense the sheet metal shell can be considered as part of the race ring to which it is fixed, so that the reservoir is entirely in said ring with the grease sealed therein except for the passages leading from the reservoir. For example, in Fig. 1, ring 112 with shell 116 really constitute the inner race ring which has a reservoir 115 entirely within it, the grease being sealed in the race ring except for passages 120 and 121.

I claim:

1. A bearing comprising a pair of race rings, and members adapted to roll between said race rings in contact with each race ring, a lubricant reservoir being formed in one race ring at a place away from said members, at least two passages being provided in the latter race ring, one leading from the reservoir to the space between the rings and serving as a feed passage and the other leading from the reservoir to atmosphere serving as a vent.

2. A bearing comprising a pair of race rings, and members adapted to roll between said race rings in contact with each race ring, a lubricant reservoir being formed in one race ring at a place away from said members, a plurality of feed passages of relatively small cross section leading from the reservoir to the space between the rings and a plurality of vent passages of relatively small cross section leading from the reservoir to the atmosphere.

3. A thrust bearing comprising a pair of race rings, members formed for rolling between the race rings in contact with each ring, said members rolling in runways formed in each ring, said runways being axially spaced from each other, space for a lubricant reservoir being provided in one race ring at a side away from its runway, said latter space being enclosed by the latter race ring except at the side of the space away from the runway and a thin walled radially extending annular shell attached to said latter race ring closing off the latter space at said latter side, at lease one feed passage being provided through the latter race ring, said passage leading from the reservoir to the runway in said latter ring.

4. A bearing comprising a pair of race rings, members adapted to roll between said race rings in contact with each race ring, one of said rings being hollowed out to form an annular groove at a place away from its place of contact with said members, and an annular thin walled shell fixed to said latter ring at the groove to enclose the space provided by said groove, forming a lubricant reservoir thereby, said latter ring being provided with at least one feed passage through it leading from the reservoir to the space between the race rings.

5. A bearing as claimed in claim 1 in which the vent passage reaches the atmosphere at a location radially inward from the feed passage.

6. A bearing comprising a pair of race rings, members adapted to roll between said race rings in contact with each race ring, space for a lubricant reservoir being provided in one race ring at a place away from said members, said space being only partially enclosed by said latter ring, and a thin walled annular shell attached to said latter ring closing off said space where not enclosed by said latter ring, said latter ring being provided with at least one feed passage through it leading from the reservoir to the space between the race rings.

7. A bearing comprising an outer race ring and an inner race ring, the latter being located radially inward from the former, members formed for rolling extending between the race rings, holding said rings in radially spaced relation, space for a lubricant reservoir being provided in one race ring at its side radially away from said members, said latter space being enclosed by said latter race ring except at the side of the space away from said members, and a thin walled substantially cylindrical shell in a tight fit with said latter race ring closing off the latter space at said latter side, said latter ring being provided with at least one feed passage through it leading from the reservoir to the space between the race rings.

8. A bearing comprising an outer race ring and an inner race ring, the latter being located radially inward from the former, members formed for rolling extending between the race rings, holding said rings in radially spaced relation, space for a lubricant reservoir being provided in the radially inward race ring at its side radially inward from said members, said latter space being enclosed by the latter race ring except at its radially inward side, and a thin walled substantially cylindrical shell fitting tightly inside the inner race ring closing off said latter space at its radially inward side, said latter ring being provided with at least one feed passage through it leading from the reservoir to the space between the race rings.

9. A bearing comprising an outer race ring and an inner race ring, the latter being located radially inward from the former, members formed for rolling extending between the race rings, holding said rings in radially spaced relation, space for a lubricant reservoir being provided in the radially outward race ring at its side radially outward from said members, said latter space being enclosed by the latter race ring except at its radially outward side, and a thin walled substantially cylindrical shell fitting tightly over the outer race ring closing off said latter space at its radially outward side, said latter ring being provided with at least one feed passage through it leading from the reservoir to the space between the race rings.

10. A bearing comprising an outer race ring and an inner race ring, the latter being located radially inward from the former, and members formed for rolling, extending between the race rings, holding said race rings in spaced relation and rolling in runways provided in said rings, space for a lubricant reservoir being provided in the inner race ring at its side radially inward from its runway, at least one feed passage being provided through the inner race ring, said passage extending generally radially outward from the reservoir to the runway in said latter ring, said reservoir being vented to atmosphere at a location radially inward from the feed passage.

MORRIS KATCHER.